UNITED STATES PATENT OFFICE.

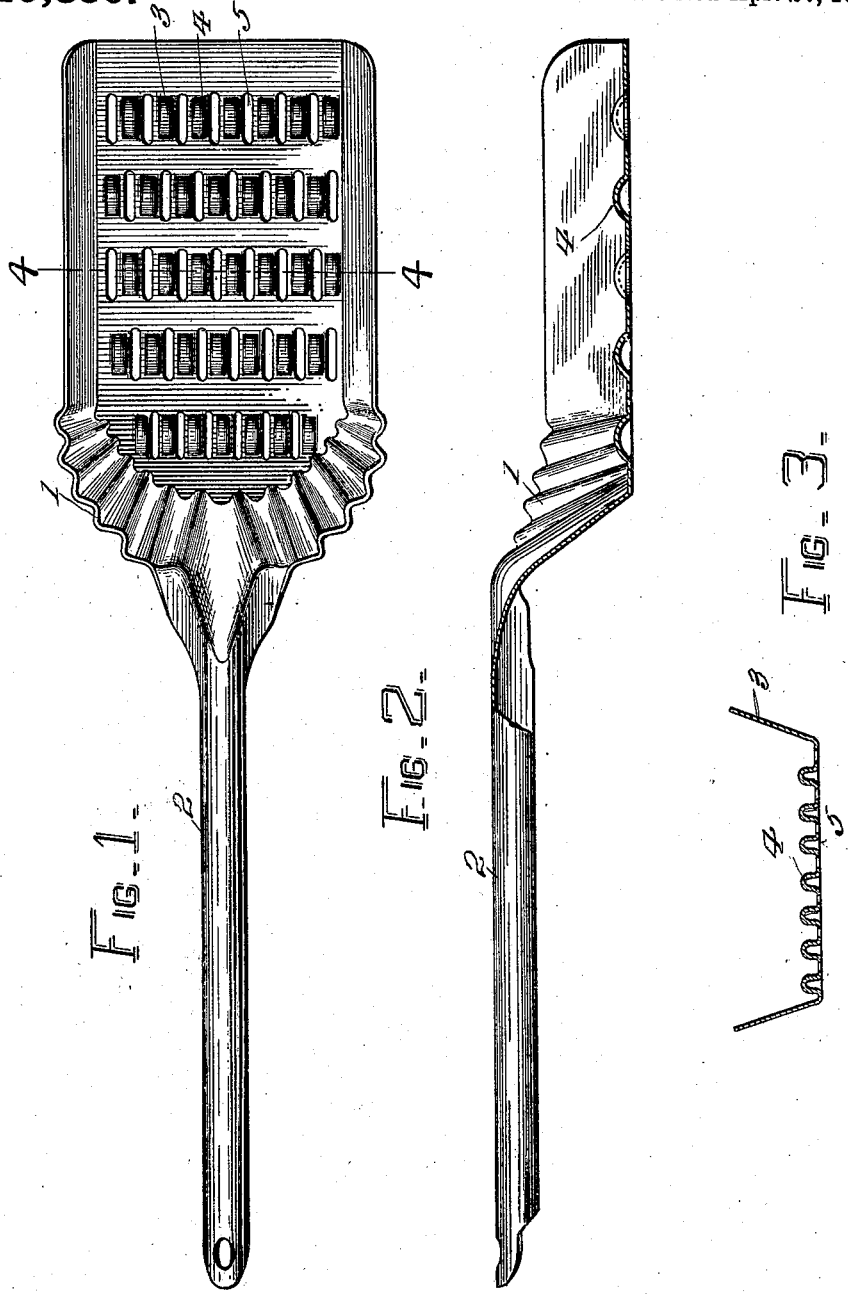

OMER C. GOULET, OF FALL RIVER, MASSACHUSETTS.

SHOVEL FOR HANDLING COAL.

No. 919,850.

Specification of Letters Patent.   Patented April 27, 1909.

Application filed November 3, 1908.  Serial No. 460,934.

*To all whom it may concern:*

Be it known that I, OMER C. GOULET, a citizen of the United States, residing at 355 Osborn street, Fall River, in the county of Bristol and State of Massachusetts, have invented a new and useful Shovel for Handling Coal, of which the following is a specification.

My invention relates more particularly to a shovel to be used in removing cinders or un-consumed coal from beneath the grate of a stove, and it has for its object the production of a utensil of this character whereby the ashes may be removed from the mass of cinders or coal without the necessity of sifting, or of picking out the cinders or coal from the mass by hand.

While my improved shovel is primarily adapted for the purpose just recited, it is obvious that it may be employed in the shoveling and automatic separation of other material in which larger masses are massed together with finer particles and from which it is desired to separate the former from the latter.

In the accompanying drawing illustrating my invention, Figure 1 is a plan view thereof; Fig. 2 a view partly in elevation and partly in longitudinal section, and Fig. 3 a cross section on line 4, 4 of Fig. 1.

Similar numerals of reference designate like parts wherever the same occur.

1 designates a shovel provided with the handle 2 of any desired form, that illustrated being the preferred form and being integral with the body of the shovel, being of rolled metal as shown.

3 is the body portion of the shovel provided with a series of raised or convex portions 4, preferably arranged in parallel relation and extending from one side of the shovel to the other, and 5 designates openings or slots cut through the bottom of the shovel and flanking the convex portions 4. The convex portions 4 and the openings 5 may be of any preferred number, according to the size of the body portion of the shovel and arranged in relation to each other in any preferred manner, although I have found the arrangement shown to be efficient, and the convexities and openings as shown can be stamped and cut in one movement of the die in the manufacture of the shovel.

The convex portions 4, as will be seen from the drawing, are of elongated form, their longer axes being in the same direction as the length of the body of the shovel, and they have rounded edge portions, whereby smaller particles of the material will not lodge upon their surfaces but will quickly descend between them. These convex portions 4 and the openings 3 are arranged in alternate relation one with the other, as shown, so that the rounded forward end of each convex portion 4 will cause the body of smaller particles in the material, as for instance the finer ashes, to be diverted to each side thereof and into and through the openings 3.

As will be readily understood from the construction shown in the drawing and heretofore described, the coarser particles of the mass which is being shoveled with my improved utensil will be supported by the convex portions 4 while the powdered or finer particles, such as the ash, can be readily separated from such larger masses by knocking the shovel against the side of the stove or other receptacle from which the material is being removed, the ashes or finer particles of the mass readily falling through the openings 5.

While I have described my shovel as adapted for the removal of ashes, cinders and unconsumed particles of coal from beneath the grate of a stove, it will be obvious that the same would be equally efficacious in shoveling coal from the bin when the coal dust could be quickly separated from the lumps of coal by agitating the shovel or jarring the same by knocking when such dust would fall through the openings 4 as heretofore described. The utensil could also be put to various other useful purposes, and in fact to any use where the separation of larger particles of matter from dust or smaller particles with which they are associated, is desired.

Having thus described my invention what I claim as new and desire to secure by Letters Patent is—

1. A sifting shovel having the bottom of its blade portion formed with a series of rounded elongated convexities the greater axes of which extend longitudinally of the shovel blade, and a series of openings arranged between said convexities and in alternate relation therewith.

2. A sifting shovel having the bottom of its blade portion formed with a series of rounded elongated convexities the greater axes of which extend longitudinally of the shovel blade, and a series of elongated openings the greater axes of which extend longitudinally of the shovel blade, and arranged between said convexities and in alternate relation therewith.

OMER C. GOULET.

Witnesses:
JAMES LITTLE,
JAMES T. CUMMINGS.